United States Patent [19]  
Seita et al.

[11] 4,431,504  
[45] Feb. 14, 1984

[54] CATION-EXCHANGE MEMBRANE FOR ELECTROLYZING ALKALI METAL HALIDE

[75] Inventors: Toru Seita; Takao Satoh; Mitsuo Kikuchi, all of Shinnanyo, Japan

[73] Assignee: Toyo Soda Manufacturing Co., Ltd., Shinnanyo, Japan

[21] Appl. No.: 373,717

[22] Filed: Apr. 30, 1982

Related U.S. Application Data

[63] Continuation-in-part of Ser. No. 197,066, Oct. 15, 1980, abandoned.

[30] Foreign Application Priority Data

Nov. 20, 1979 [JP] Japan .................. 54-149584

[51] Int. Cl.³ .................................. C25B 13/08  
[52] U.S. Cl. .................................. 204/296  
[58] Field of Search .............. 204/296, 295, 301

[56] References Cited

U.S. PATENT DOCUMENTS

| | | | |
|---|---|---|---|
| 4,147,599 | 4/1979 | O'Leary et al. | 204/87 |
| 4,165,248 | 8/1979 | Darlington et al. | 204/296 X |
| 4,166,014 | 8/1979 | Sata et al. | 204/98 |
| 4,178,218 | 12/1979 | Seko | 204/98 |

*Primary Examiner*—F. Edmundson  
*Attorney, Agent, or Firm*—Armstrong, Nikaido, Marmelstein & Kubovcik

[57] ABSTRACT

A cation-exchange membrane for electrolyzing an aqueous solution of an alkali metal halide in the manufacture of an alkali hydroxide and a halogen. The membrane comprises one layer which occupies 5 to 30% of the total thickness of the membrane and has carboxylic acid groups; another layer which occupies 5 to 30% of the membrane thickness and has weakly acidic groups, the weakly acidic groups occupying 10 to 60% of the total exchange group capacity of the layer; and a further layer which has sulfonic acid groups occupying the middle portion of the membrane.

5 Claims, No Drawings

CATION-EXCHANGE MEMBRANE FOR ELECTROLYZING ALKALI METAL HALIDE

BACKGROUND OF THE INVENTION

This invention is a continuation-in-part application of a U.S. patent application Ser. No. 197,066 filed on Oct. 15, 1980, now abandoned.

The invention relates to a novel cation-exchange membrane which has been entirely unknown and more particularly to a cation-exchange membrane adapted for use in an electrolytic process in which an alkali metal halide is supplied to an anode chamber and water to a cathode chamber for carrying out electrolsis to obtain a halogen from the anode chamber and hydrogen and an alkali metal hydroxide from the cathode chamber.

There have appeared cation-exchange membranes having the substrate thereof made of perfluorocarbon polymer and adapted for use as electrolytic diaphragms for electrolyzing alkali metal halides. A typical example of such cation exchange membranes is a sulfonic acid type membrane made of a perfluorocarbon polymer marketed by DuPont Co.

While this membrane is impeccable with respect to durability, it has not been satisfactory in terms of cation transference in an electrolytic solution containing hydroxyl ion. Hence various methods have been studied for improvement over such known membrane and are still under study. The methods under study include, for example:

(1) A method of arranging the concentration of the exchange groups on one side of the membrane facing a cathode chamber to be lower than that of the other side facing the anode chamber.

(2) A method of arranging the acidity of the exchange groups on one side of the membrane facing the cathode chamber to be weaker than that of the exchange groups on the other side facing the anode chamber.

(3) Another method in which a weakly acidic exchange groups are used.

It is well known that the cost of production generally depends not only on power consumption but also greatly on the rate of decomposition of the alkali metal halide used and the concentration of the alkali hydroxide produced. Further, if the purity of the alkali metal hydroxide thus obtained is low, industrial production would be hardly possible even if the production cost is low.

For an efficient industrial mnufacturing operation, therefore, it is necessary to thoroughly study the balance between these factors in developing a membrane suitable for industrial manufacture.

In cases where the above stated improved cation-exchange membrane of the prior art is used for enhancing the rate of decomposition of the alkali metal halide and for obtaining an alkali metal hydroxide in high concentration in carrying out electrolysis, the current efficiency decreases. Besides, it often happens that an alkali metal halide mixes in the alkali metal hydroxide formed.

In an attempt to solve these problems, the present inventors strenuously conducted studies and have come to complete the present invention. It is therefore a general object of the invention to provide a novel cation-exchange membrane which solves these problems. In other words, in an electrolytic process for obtaining hydrogen and an alkali metal hydroxide from an anode chamber by carrying out electrolysis with an aqueous solution of an alkali metal halide supplied to the anode chamber and with water poured into a cathode chamber, a desired effect has been attained by using the invented cation-exchange membrane consisting of one layer which has carboxylic acid groups contained therein to an extent in depth of 5 to 30% of the thickness of the membrane; another layer which has weakly acidic groups therein to an extent in depth 5 to 30% of the thickness of the membrane and yet at a rate of 10 to 60% of the total exchange group capacity of the thickness of the layer; and a further layer which has sulfonic acid groups contained therein and is located in the middle portion of the membrane.

The present invention will become more apparent from the following detailed description thereof:

In the cation-exchange membrane according to the invention, the membrane resistance would become high to result in an undesirable rise of the bath voltage if one or another layer thereof containing the carboxylic acid groups or the weakly acidic groups sould exceed 30% of the total membrane thickness. On the other hand, arrangement to have the occupy less than 5% of the total membrane thickness is also not desirable because it would result in a low current efficiency.

Further, the ratio of the weakly acidic groups arranged to be contained within the layer facing another layer containing the carboxylic acid groups, that is, the ratio of the exchange capacity of the weakly acidic groups to the total exchange capacity of the layer containing the weakly acidic groups is a very important factor, because:

Generally, in the manufacture of NaOH and $Cl_2$ through sodium chloride electrolysis, the purity of the $Cl_2$ produced within the anode chamber often presents a serious problem for industrial production. This is because the $OH^\ominus$ which reversely diffuse from the cathode chamber reacts at the anode and this generates $O_2$ to increase the $O_2$ within the $Cl_2$. Generally, the rate of $O_2$ within $Cl_2$ must be held below 0.5% where $Cl_2$ is to be used for industrial purposes though it somewhat varies with the purpose.

It has been a general practice to suppress the generation of the $O_2$ by neutralizing the back diffusion of $OH^\ominus$ by adding hydrochloride acid to the anode chamber. In accordance with this method, if a cation-exchange membrane having weakly acidic groups as exchange group is used, the exchange group would become hardly dissociable to cause a salient rise of the bath voltage. In view of this, the amount of the weakly acidic groups in the layer facing the anode chamber must be carefully controlled. According to the findings made by the present invention, a preferable amount of it is within a range of 10 to 60%.

The electrolytic method based on such a novel viewpoint had been unknown before it was discovered by the present inventors. Although the exact reason for the excellent results attainable by the method of the invention is not clear, it can be explained as follows:

One side of the membrane located on the side of the anode chamber swells according as the rate of decomposition of the alkali metal halide in the anode chamber is increased. This causes the aqueous solution of the alkali metal halide to encroach upon the membrane. As a result of this, the water content in the membrane increases to lower the concentration of fixed ion. The lowered fixed ion concentration in turn lowers the current efficiency. Further, the alkali metal halide within the membrane then moves to the cathode chamber to eventually degrade the purity of the alkali metal hydroxide produced.

Where the other side of the membrane facing the cathode chamber is arranged to swell to a very slight degree, a difference in swelling degree between the two sides of the membrane becomes greater and would eventually come to break the membrane. To avoid this, the degree of swelling of the side of the membrane facing the anode chamber must be lowered. Further, arrangement to increase the rate of decomposition of the alkali metal halide in the anode chamber tends to decrease the concentration of the alkali metal halide. On the other hand, if the concentration of the alkali metal hydroxide produced at the cathode chamber is tending to increase, the swelling of the side of the membrane facing the anode chamber becomes greater than the swelling of the other side of the membrane facing the cathode chamber. It is believed that this tendency then comes to bring forth the above stated undesirable results.

The fluorocarbon polymer to be used for the manufacture of the cation-exchange membrane according to the invention can be selected out of polymers, for example, expressed by the following generic formula:

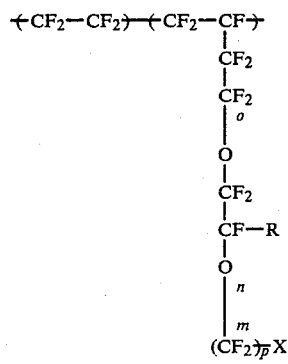

wherein
R: —CF$_3$, —CF$_2$—O—CF$_3$ n: 0 or 1-5 m: 0 or 1
O: 0 or 1 p: 1-6
X: —SO$_2$F, —SO$_2$Cl, —COOR$_1$ (R$_1$: 1-5 alkyl groups), —CN, —COF The polymer is made into a filmy shape before use. Further, a polymer which is polymerized by adding a third or fourth component to the above stated two-component system may be used. Such a polymer may be selected, for example, from the following groups A and B:

Group A:

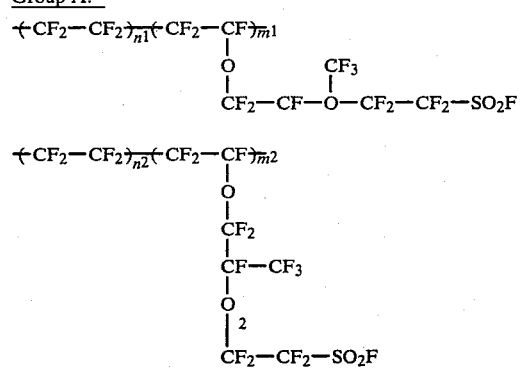

-continued

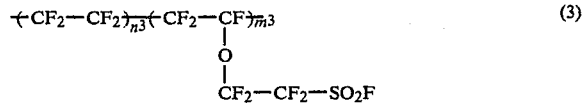

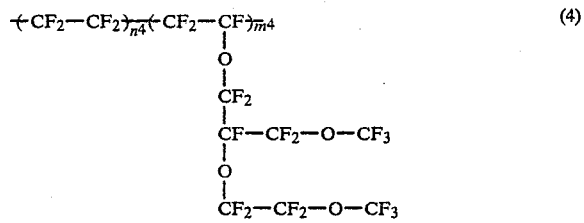

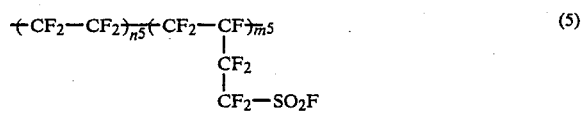

Group B:

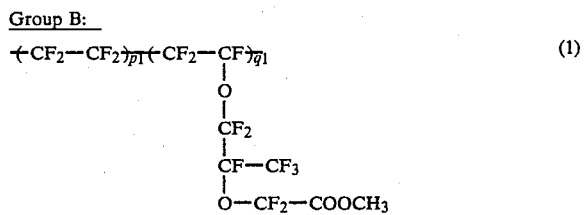

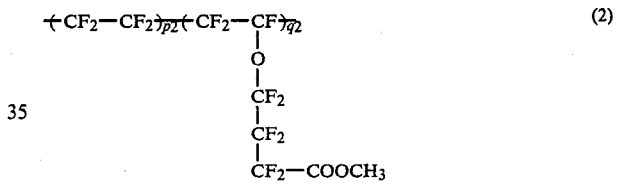

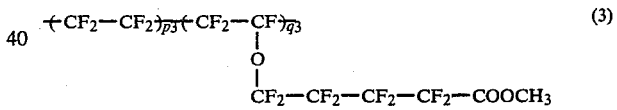

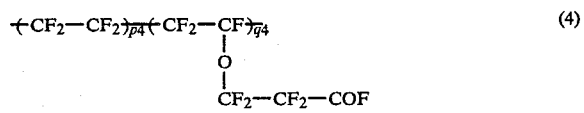

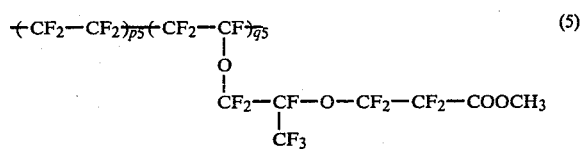

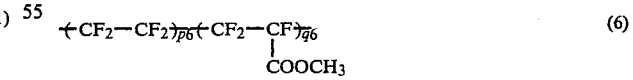

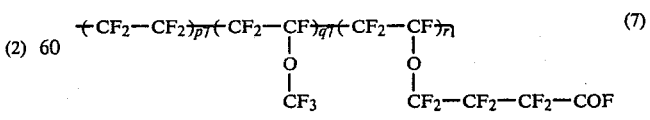

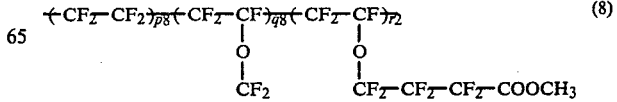

-continued

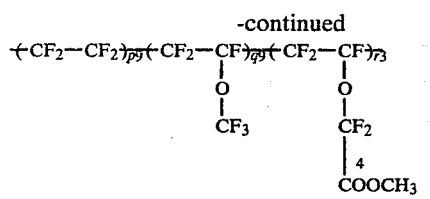

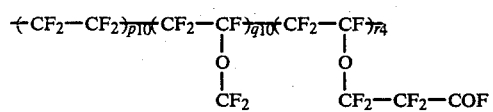

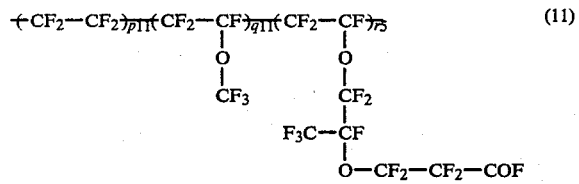

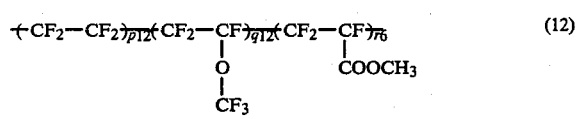

The film of such a polymer is prepared preferably by adjusting the weight of the resin containing 1 equivalent of the exchange group to a value between 500 and 2800 g (hereinafter will be expressed as EW=500–2800).

The cation-exchange membrane according to the invention is prepared using the above stated film, for example, in the following manner:

(1) The film of a polymer selected from the group A is treated with a reducing agent.

(2) The film of a polymer selected from the Group A is allowed to react with a compound which has a carboxylic acid group, a phosphoric acid group or a group that can be converted into one of these groups and which has a double bond. After the reaction, a process is carried out for conversion into a carboxylic acid group or a phosphoric acid group.

(3) A film of a polymer selected from the group A and a film of a polymer selected from the group B are stuck together. The surface of the former is then treated either as mentioned in Para. (1) or as mentioned in Para. (2) above.

It goes without saying that the present invention is not limited to these methods of preparation.

The cation-exchange membrane according to the invention is used normally in thickness between 0.05 mm and 1.5 mm. The thickness is selected with specific conductivity of the membrane and current efficiency taken into consideration.

The invented cation-exchange membrane arranged as described in the foregoing is employed as diaphragm for an electrolytic device which comprises at least an anode, a cathode, the diaphragm which divides an electrolytic cell into an anode chamber and a cathode chamber and a means which is arranged outside the cell for allowing a current to flow between the anode and the cathode. Then, it is preferable to have carboxylic acid groups used as the functional groups on the side facing the cathode. Electrolysis is carried out while an aqueous solution of an alkali metal halide is supplied to the anode chamber. Meanwhile, the concentration of the alkali hydroxide to be taken out from the cathode chamber is adjusted by supplying water to the cathode chamber as necessary. The electrolysis is carried out at a temperature between room temperature and 100° C. and preferably within a range from 50 to 95° C.

The electrolyzing operation may be carried out at a current density of 5 to 50 A/dm². An operation at a current density exceeding 50 A/dm² is not always advantageous because of a salient increase in the cell voltage which takes place at such a high current density.

The aqueous solution of the alkali metal halide to be supplied to the anode chamber is purified before use in the same manner as in the conventional method for electrolyzing an alkali metal halide. Particularly, it is desirable that magnesium and calcium are thoroughly removed from the aqueous solution before use. The concentration of the aqueous solution of the alkali metal halide to be supplied is preferably close to saturation and is normally within a range from 250 g/l to 350 g/l.

As for electrodes, the cathode usable in accordance with the invention is made from iron, stainless steel, or a material prepared by plating iron with nickel or a nickel compound. The anode is prepared by coating a titanium with an oxide of a noble metal such as platinum or ruthenium. With metal electrodes of a high degree of dimensional stability used, they can be spaced as close as several mm to minimize the fall of potential between them for reduction in power consumption. A suitable spacer may be used to prevent the electrodes from coming into contact with the membrane.

The invention will be more clearly understood with reference to the following examples. However, these examples are intended to illustrate the invention and are not to be construed to limit the scope of the invention.

EXAMPLE 1:

A film (EW=1100; film thickness =5 mils) made from a copolymer obtained from copolymerization of monomer of the formulas

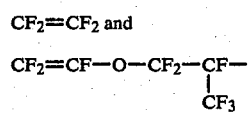

and another film (EW=850; film thickness=1.5 mil) made from a copolymer obtained from copolymerization of formulas

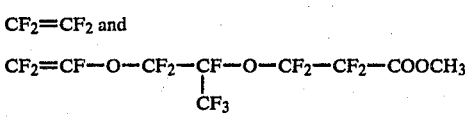

were stuck together to obtain a composite film. The film thus obtained was subjected to hydrolysis over a period of 16 hours at 80° C. in a mixed solution of 10% NaOH and methanol (ratio by weight was 1:1).

Then, in form of salt the cation-exchange membrane is allowed to react in a mixed solution of phosphorus pentachloride and phosphorus oxychloride (ratio by weight was 1:1) over a period of 3 days at a temperature between 120° and 130° C. After washing with water, the membrane was allowed to react in hydriodic acid over a period of 3 days at 90° C.

As a result of these processes, it was found that about 20% of the sulfonic acid groups had been converted into carboxylic acid groups within a thickness range of about 1 mil.

The cation-exchange membrane was used as diaphragm for partitioning between an anode and cathode chambers to prepare an electrolytic cell having an effective area of 30×30 cm. Saturated brine was supplied to the anode chamber to obtain an exit concentration of 180 g/l. Water was supplied to the cathode chamber to obtain an exit concentration of 30% by weight. Under this condition, electrolysis was carried out at a current density of 30 A/dm$^2$ and at a temperature of 85° C. Current efficiency, voltage and the concentration of sodium chloride in an aqueous solution of caustic soda obtained under a stable operating condition were as shown in Table 1 below:

TABLE 1

| Current efficiency (%) | Voltage (V) | Sodium chloride contained in an aqueous solution of caustic soda (ppm) |
|---|---|---|
| 92 | 3.8 | 25 |

EXAMPLE 2

Using the same cation-exchange membrane as the one used in Example 1, an operation was carried out in the same manner as in Example 1 except that hydrochloric acid was added to the anode chamber to make O$_2$ in Cl$_2$ less than 0.5%. The current efficiency, voltage and the concentration of sodium chloride in an aqueous solution of caustic soda under a stable operating condition were as shown in Table 2.

TABLE 2

| Current efficiency (%) | Voltage (V) | Sodium chloride contained in an aqueous solution of caustic soda (ppm) |
|---|---|---|
| 94 | 3.9 | 23 |

COMPARISON EXAMPLE 1

In the cation-exchange membrane of Example 2, 70% of the sulfonic acid groups were converted into carboxylic acid groups within a thickness range of 1 mil. Then, an operation was carried out in the same manner as in Example 2. Under a stable operating condition, the current efficiency, voltage and the concentration of sodium chloride in an aqueous solution of caustic soda were as shown in Table 3.

TABLE 3

| Current efficiency (%) | Voltage (V) | Sodium chloride contained in an aqueous solution of caustic soda (ppm) |
|---|---|---|
| 94 | 4.3 | 20 |

COMPARISON EXAMPLE 2

An operation was carried out in the same manner as in Example 1 except that, in the cation-exchange membrane used in Example 1, the sulfonic acid groups were not converted into carboxylic acid groups in this example. Under a stable operating condition, the current efficiency, voltage and the concentration of sodium chloride in an aqueous solution of caustic soda were as shown in Table 4.

TABLE 4

| Current efficiency (%) | Voltage (V) | Sodium chloride contained in an aqueous solution of caustic soda (ppm) |
|---|---|---|
| 88 | 3.7 | 70 |

EXAMPLE 3

An operation was carried out in the same manner as in Example 2 except that 50% of the sulfonic acid group containing layer of the cation-exchange membrane used in Example 2 was converted into carboxylic acid groups within the thickness range of 2 mils in Example 3.

Under a stable operating condition, the current efficiency, voltage and the concentration of sodium chloride in an aqueous solution of caustic soda were as shown in Table 5.

TABLE 5

| Current efficiency (%) | Voltage (V) | Sodium chloride contained in an aqueous solution of caustic soda (ppm) |
|---|---|---|
| 95 | 4.0 | 13 |

COMPARISON EXAMPLE 3

An operation was carried out in the same manner as in Example 3 except that 100% of the sulfonic acid group containing layer was converted into a carboxylic acid group within a thickness range of 2 mils in this case.

Under a stable operating condition, the current efficiency, voltage and the concentration of sodium chloride in an aqueous solution of caustic soda were as shown in Table 6.

TABLE 6

| Current efficiency (%) | Voltage (V) | Sodium chloride contained in an aqueous solution of caustic soda (ppm) |
|---|---|---|
| 95 | 4.4 | 12 |

What is claimed is:

1. A cation-exchange membrane for electrolyzing an alkali metal halide having a thickness between 0.05 mm and 1.5 mm and being made from a polymer having 1 equivalent of exchange group to 500 to 2800 g, said membrane comprising a first layer which has carboxylic acid groups and occupies 5 to 30% of the total thickness of the membrane; a second layer which has sulfonic acid groups and weakly acidic groups and occupies 5 to 30% of the total membrane thickness, said weakly acidic groups occupying 10 to 60% of the total exchange group capacity of said second layer; and an intermediate layer which has sulfonic acid groups.

2. A cation-exchange membrane according to claim 1, said membrane being made of a perfluorocarbon polymer.

3. A cation-exchange membrane according to claim 1 or 2, wherein said weakly acidic groups are carboxylic acid groups.

4. A cation-exchange membrane according to claim 1 or 2, wherein said weakly acidic groups are phosphoric acid groups.

5. A cation-exchange membrane according to claim 1, comprising a first layer which has carboxylic acid groups therein and occupies 5 to 30% of the total thickness of the membrane on one side thereof and a second layer which has sulfonic acid groups and occupies the rest of the membrane thickness on the opposite side of said first layer, said second layer including a third layer in which the sulfonic acid groups are replaced with weakly acidic groups to an extent of thickness 5 to 30% of the total membrane thickness from the surface of the second layer, the replacing degree of the weakly acidic groups within said third layer being 10 to 60% of the exchange capacity of the sulfonic acid groups originally existed in the third layer.

* * * * *

UNITED STATES PATENT AND TRADEMARK OFFICE
CERTIFICATE OF CORRECTION

PATENT NO. : 4,431,504
DATED : February 14, 1984
INVENTOR(S) : TORU SEITA ET AL

It is certified that error appears in the above-identified patent and that said Letters Patent is hereby corrected as shown below:

Column 3, lines 26-40, delete the formula in its entirety and substitute therefor the following:

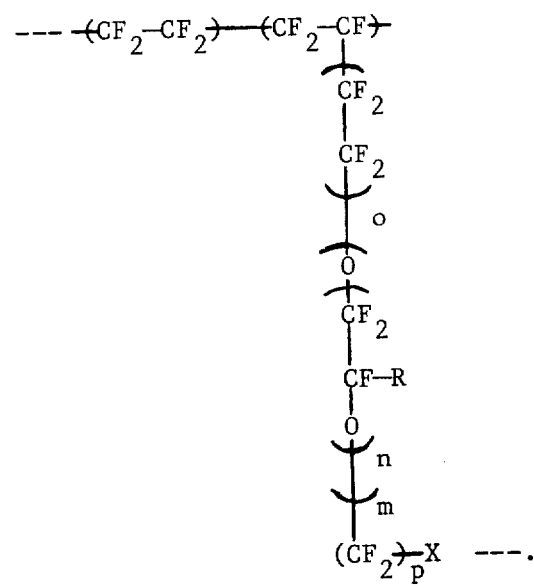

UNITED STATES PATENT AND TRADEMARK OFFICE
CERTIFICATE OF CORRECTION

PATENT NO. : 4,431,504
DATED : February 14, 1984
INVENTOR(S) : TORU SEITA ET AL

It is certified that error appears in the above-identified patent and that said Letters Patent is hereby corrected as shown below:

Column 3, lines 55-70, delete the formula in its entirety and substitute therefor the following:

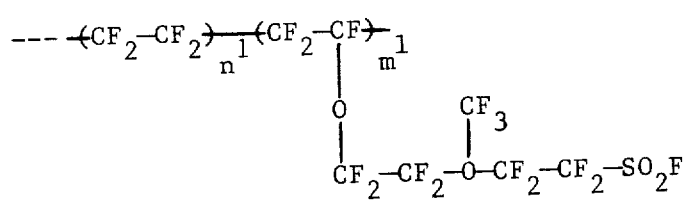 (1)

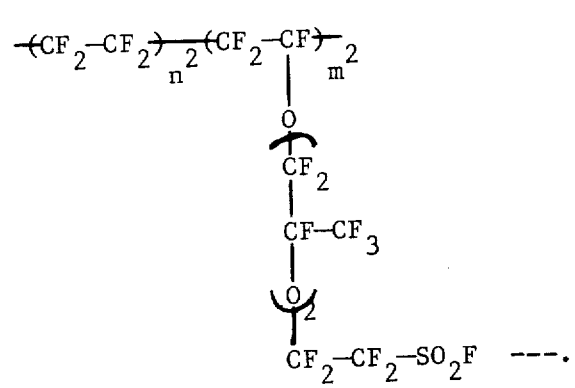 (2)

UNITED STATES PATENT AND TRADEMARK OFFICE
CERTIFICATE OF CORRECTION

PATENT NO. : 4,431,504
DATED : February 14, 1984
INVENTOR(S) : TORU SEITA ET AL

It is certified that error appears in the above-identified patent and that said Letters Patent is hereby corrected as shown below:

Column 5, lines 2-13, delete the formula in its entirety and substitute therefor the following:

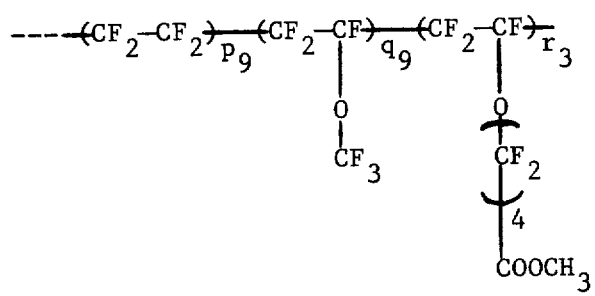  (9)

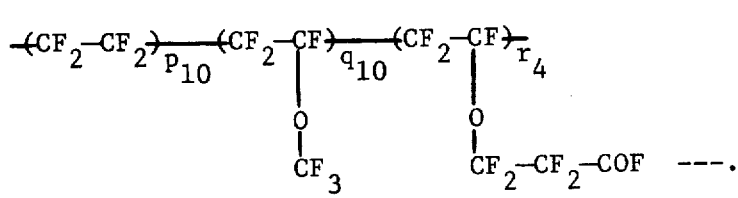  (10)

Signed and Sealed this

Twenty-third Day of July 1985

[SEAL]

Attest:

DONALD J. QUIGG

Attesting Officer   Acting Commissioner of Patents and Trademarks